(12) United States Patent
Niitsuma et al.

(10) Patent No.: US 8,844,855 B2
(45) Date of Patent: Sep. 30, 2014

(54) SPOOL BRAKE DEVICE FOR DUAL-BEARING REEL

(75) Inventors: Akira Niitsuma, Osaka (JP); Noriyuki Horiuchi, Nara (JP)

(73) Assignee: Shimano Inc., Osaka (JP)

( * ) Notice: Subject to any disclaimer, the term of this patent is extended or adjusted under 35 U.S.C. 154(b) by 138 days.

(21) Appl. No.: 13/548,594

(22) Filed: Jul. 13, 2012

(65) Prior Publication Data

US 2013/0037645 A1 Feb. 14, 2013

(30) Foreign Application Priority Data

Aug. 8, 2011 (JP) ................. 2011-173026

(51) Int. Cl.
*A01K 89/01* (2006.01)
*A01K 89/0155* (2006.01)

(52) U.S. Cl.
CPC ................. *A01K 89/01555* (2013.01)
USPC ........................................ 242/288; 242/223

(58) Field of Classification Search
USPC ................................................ 242/223, 288
See application file for complete search history.

(56) References Cited

U.S. PATENT DOCUMENTS

| | | | | |
|---|---|---|---|---|
| 4,714,208 A * | 12/1987 | Holahan et al. | ................. | 242/288 |
| 4,940,194 A | 7/1990 | Young | | |
| 5,560,560 A * | 10/1996 | Hirose | ............................ | 242/223 |
| 5,639,038 A * | 6/1997 | Hirose | ............................ | 242/223 |
| 5,833,156 A * | 11/1998 | Park et al. | ....................... | 242/289 |
| 6,412,722 B1 | 7/2002 | Kreuser et al. | | |
| 6,973,999 B2 * | 12/2005 | Ikuta et al. | ....................... | 188/161 |
| 7,159,813 B2 * | 1/2007 | Ikuta et al. | ....................... | 242/289 |
| 7,188,793 B2 * | 3/2007 | Ikuta et al. | ....................... | 242/223 |
| 7,503,517 B2 * | 3/2009 | Ikuta et al. | ....................... | 242/288 |
| 7,648,096 B2 * | 1/2010 | Niitsuma et al. | ............... | 242/289 |
| 7,819,353 B2 * | 10/2010 | Nakagawa et al. | ............ | 242/223 |
| 2006/0169813 A1 | 8/2006 | Nakagawa et al. | | |
| 2007/0108330 A1* | 5/2007 | Ikuta et al. | ....................... | 242/288 |
| 2009/0166459 A1 | 7/2009 | Niitsuma et al. | | |

FOREIGN PATENT DOCUMENTS

JP 2009-159847 A 7/2009

OTHER PUBLICATIONS

Extended European Search Report of the corresponding European Application No. 12174186.2, dated Dec. 6, 2012.

\* cited by examiner

*Primary Examiner* — Emmanuel M Marcelo
(74) *Attorney, Agent, or Firm* — Global IP Counselors (57) ABSTRACT

A spool brake device for a dual-bearing reel according to a first aspect of the present invention is a device configured to electrically brake a spool rotatably mounted to a reel unit of the dual-bearing reel for allowing a fishing line to be wound thereabout. The spool brake device includes a spool brake unit including a magnet configured to rotate in conjunction with rotation of the spool, and a coil configured opposite to the magnet to generate electric current with rotation of the magnet, a tension detecting unit configured to detect and measure tension on the fishing line, and a spool control unit configured to control the spool brake unit by analog-controlling electric current flowing through the coil on the basis of how large the tension is.

4 Claims, 9 Drawing Sheets

SPOOL BRAKE DEVICE FOR DUAL-BEARING REEL

CROSS-REFERENCE TO RELATED APPLICATIONS

This application claims priority to Japanese Patent Application No. 2011-173026 filed on Aug. 8, 2011. The entire disclosure of Japanese Patent Application No. 2011-173026 is hereby incorporated herein by reference.

BACKGROUND

1. Field of the Invention

The present invention relates to a braking device, and particularly to a spool brake device for a dual-bearing reel, which is rotatably supported by a reel unit of the dual-bearing reel and is configured to electrically brake a spool for winding a fishing line thereabout.

2. Background Art

The well-known spool brake device for dual-bearing reel is normally configured to electrically brake a spool and includes power generating mechanism, which is formed by a coil and a magnet between a spool and reel unit. The well-known spool brake device is configured to electrically control the power generating mechanism for braking force during casting a fishing rod.

Japan Laid-open Patent Application Publication No. JP-A-2009-159847 describes an example of the well-known spool brake device including a magnet, a coil, a tension detection unit, and, a control mechanism. The magnet is disposed in the spool. The coil is disposed in the reel unit. The tension detection unit is configured to detect tension acting on a fishing line. The control mechanism is configured to determine a braking starting timing based on a detected tension and control electricity flowing through the coil. The well-known spool brake device for a dual-bearing reel is configured to detect variation in tension since starting of casting and start executing a predetermined control when tension becomes less than or equal to a predetermined value. Specifically, the well-known spool brake device is configured to execute a digital switching control for a switching element for regulating braking force to be target braking force expressed by a gradually decreasing duty cycle as a digital value.

In the aforementioned well-known spool brake device, the duty cycle is considered as braking force. Therefore, when electromotive force of the coil varies due to variation in size and attachment position of the magnet and the coil, current values vary even if a switching control is executed at the duty ratio set as the target braking force. This can destabilize the braking force.

It is an advantage of the present invention to reliably apply stable braking force to a spool even when electromotive force of a coil varies.

SUMMARY

A spool brake device for a dual-bearing reel according to a first aspect of the present invention is a device configured to electrically brake a spool rotatably mounted to a reel unit of the dual-bearing reel for allowing a fishing line to be wound thereabout. The spool brake device includes a spool brake unit including a magnet configured to rotate in conjunction with rotation of the spool, and a coil configured opposite to the magnet to generate electric current with rotation of the magnet, a tension detecting unit configured to detect and measure tension on the fishing line, and a spool control unit configured to control the spool brake unit by analog-controlling electric current flowing through the coil on the basis of how large the tension is.

BRIEF DESCRIPTION OF THE DRAWINGS

Referring now to the attached drawings which form a part of this original disclosure.

DETAILED DESCRIPTION OF THE EXEMPLARY EMBODIMENTS

Reel Structure

Figure 1:
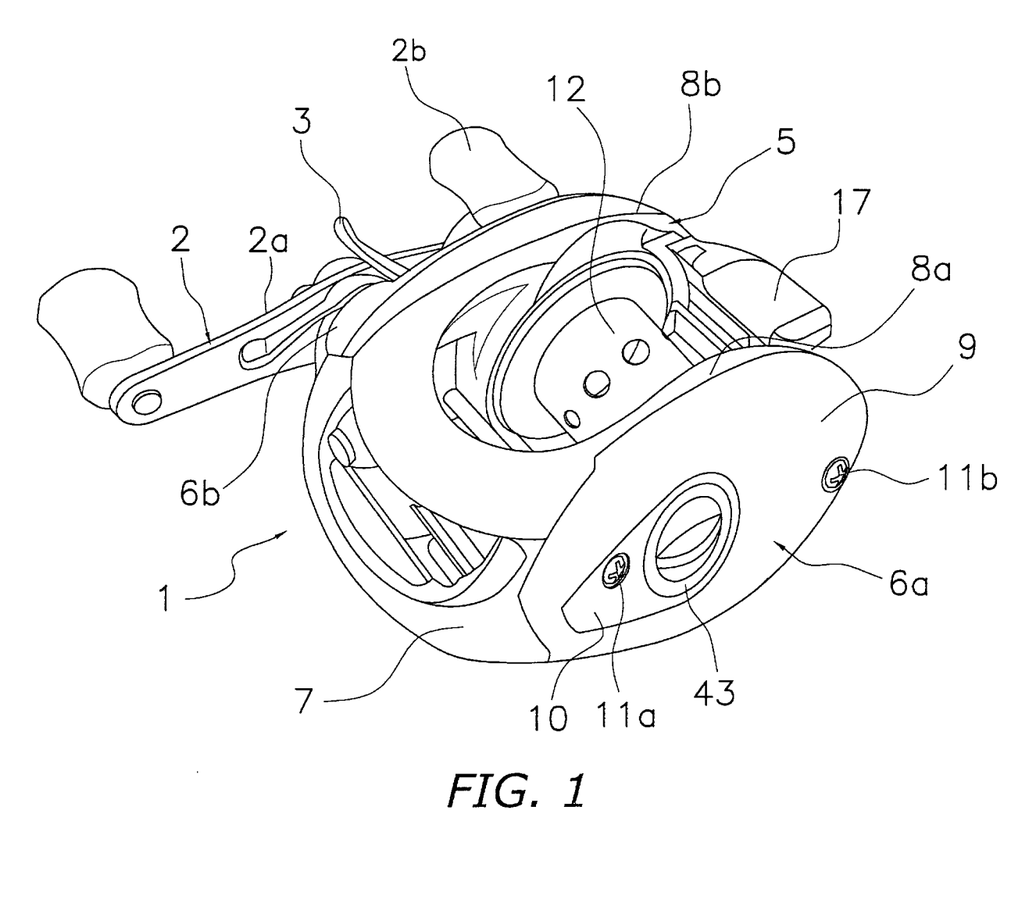
FIG. 1 is a perspective view of a dual-bearing reel employing an exemplary embodiment of the present invention.
Figure 2:
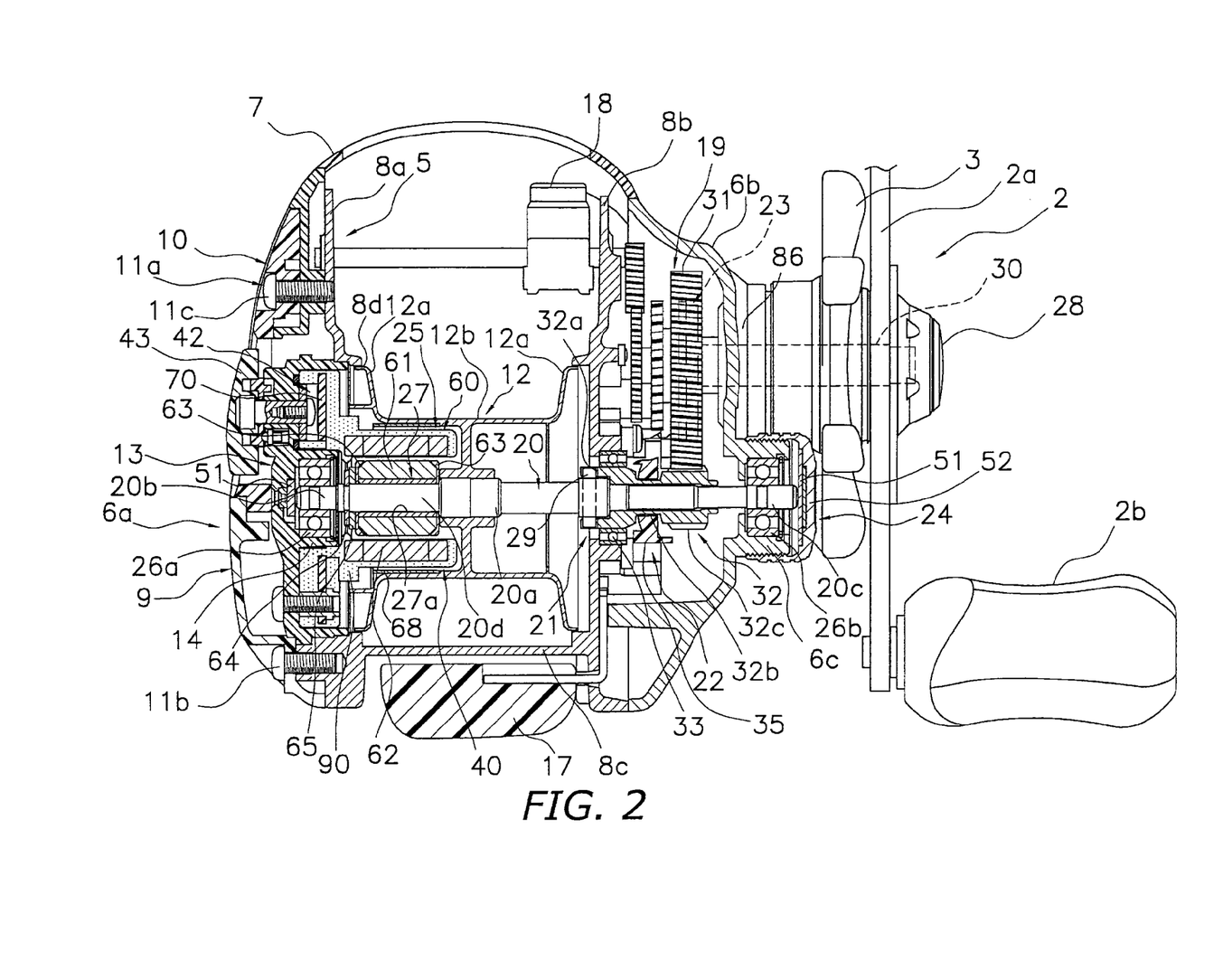
FIG. 2 is a cross-sectional view of the internal structure of a reel unit of the dual-bearing reel.
Figure 3:
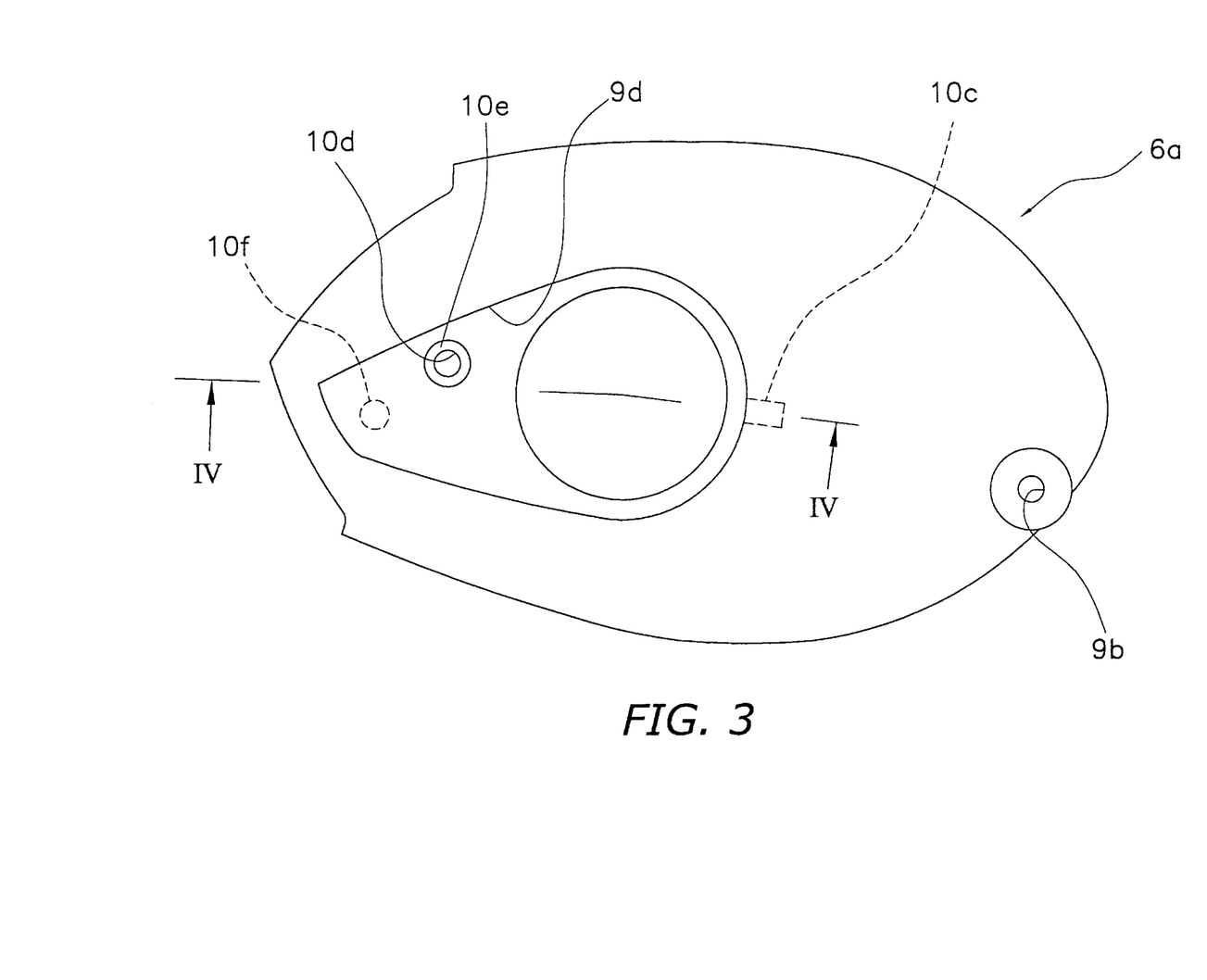
FIG. 3 is a face-on view a first side cover.

FIGS. 1 and 2 illustrate a dual-bearing reel according to an exemplary embodiment of the present invention. The dual-bearing reel is a low-profile dual-bearing reel for bait casting. The dual-bearing reel includes a reel unit 1, a handle 2, and a star drag 3. The handle 2, which is used for rotating a spool, is disposed on a lateral side of the reel unit 1. The star drag 3, which his used for regulating drag, is disposed on a reel unit side of the handle 2.

The handle 2 is of a double-handle type and includes a handle arm 2a and knobs 2b rotatably attached to the both ends of the handle arm 2a. As illustrated in FIG. 2, the handle arm 2a is non-rotatably attached to a tip of a handle shaft 30. The handle arm 2a is coupled to the handle shaft 30 by a nut 28.

The reel unit 1 is a member made of light metal, such as magnesium alloy. The reel unit 1 includes a frame 5, a first side cover 6a, a second side cover 6b, and a front cover 7. The first side cover 6a is attached to the left side of the frame 5, while the second side cover 6b is attached to the right side of the frame 5. Further, a spool 12 for winding a fishing line is rotatably attached to the inside of the reel unit 1 through a spool shaft 20 (see FIG. 2).

As illustrated in FIG. 2, the frame 5 accommodates the spool 12, a clutch lever 17, and a level winding mechanism 18. The clutch lever 17 functions as a thumb pad in thumbing the fishing line. The level winding mechanism 18 is configured to uniformly wind the fishing line around the spool 12. Further, a gear mechanism 19, a clutch mechanism 21, a clutch control mechanism 22, a drag mechanism 23, and a casting control mechanism 24 are disposed between the frame 5 and the second side cover 6b. The gear mechanism 19 is configured to transfer rotational force from the handle 2 to the spool 12 and the level winding mechanism 18. The clutch mechanism 21 is configured to couple or decouple the spool 12 and the handle 2. The clutch control mechanism 22 is configured to control the clutch mechanism 21 in response to an operation of the clutch lever 17. The drag mechanism 23 is configured to brake rotation of the spool 12 in the fishing-line releasing direction in a clutch-on state. The casting control mechanism 24 is configured to regulate resistance produced when the spool 12 is rotated. Further, an electrically controlled spool brake mechanism 25 (an exemplary spool brake device) is disposed between the frame 5 and the first side cover 6a. The spool brake mechanism 25 is configured to inhibit occurrence of backlash in casting a fishing rod.

The frame 5 includes a first side plate 8a, a second side plate 8b and a plurality of coupling portions 8c. The first and second side plates 8a and 8b are opposed at a predetermined interval. The plural coupling portions 8c integrally couple the first and second side plates 8a and 8b. The first side plate 8a has a circular opening 8d. A spool support part 13, which forms a part of the reel unit 1, is screwed into the opening 8d. The spool support part 13 has a bearing accommodation portion 14 for accommodating a first bearing 26a supporting an end of the spool 12.

The first side cover 6a is a member formed by molding synthetic resin such as polyamide resin in a mold. As illustrated in FIGS. 2, 3, 4, and 5, the first side cover 6a is shaped for covering the outside of the first side plate 8a. The first side cover 6a includes a cover body 9 and a name plate 10 fixed to the cover body 9 by a screw. The cover body 9 is fixed to the outer surface of the first side plate 8a by first and second screw members 11a and 11b externally screwed therein. The cover body 9 includes a first through hole 9a and a second through hole 9b for allowing the first screw member 11a and the second screw member 11b to pass therethrough, respectively. The cover body 9 has a knob opening 9c for exposing a mode knob 43 to be described to the outside.

The cover body 9 has an attachment recess 9d on the outer surface thereof The attachment recess 9d is formed about the knob opening 9c for attaching the name plate 10 thereto. The attachment recess 9d is formed in a roughly raindrop-like shape to be matched with the contour of the name plate 10.

The name plate 10 is a member made of synthetic resin such as polyamide resin. The name plate 10 is formed in a roughly tapered raindrop-like shape. The name plate 10 has a circular portion 10b on a rear part thereof The circular portion 10b has an opening 10a to be opposed to the knob opening 9c. The circular portion 10b has a locking pawl 10c on the outer peripheral surface thereof. The locking pawl 10c protrudes rearwards and is locked on the back surface of the cover body 9. The cover body 9 has a slit 9f on the rear part of the knob opening 9c. The locking pawl 10c is fitted into the slit 9f. The rear part of the name plate 10 is locked with the cover body 9 through the locking pawl 10c. The name plate 10 can be thereby inhibited from being deformed leftwards (i.e., upwards in FIG. 4). The name plate 10 has a third through hole 10d in the front part thereof. The third through hole 10d is opposed to the first through hole 9a of the cover body 9. The name plate 10 has a head mount portion 10e recessed about the third through hole 10d. A head portion 11c of the first screw member 11a is accommodated in the head mount portion 10e. Therefore, the head portion 11c of the first screw member 11a is prevented from protruding from the outer surface of the first side cover 6a as illustrated in FIG. 2. The name plate 10 and the cover body 9 are unitarily fixed to the first side plate 8a by the first screw member 11a. A sink mark of resin can be thereby prevented from being formed on the name plate 10, otherwise formed in fixing the name plate 10 from the inside. It should be noted that both of the name plate 10 and the first screw member 11a have a color of black, and therefore the first screw member 11a is prevented from visually standing out against the name plate 10.

Figure 4:
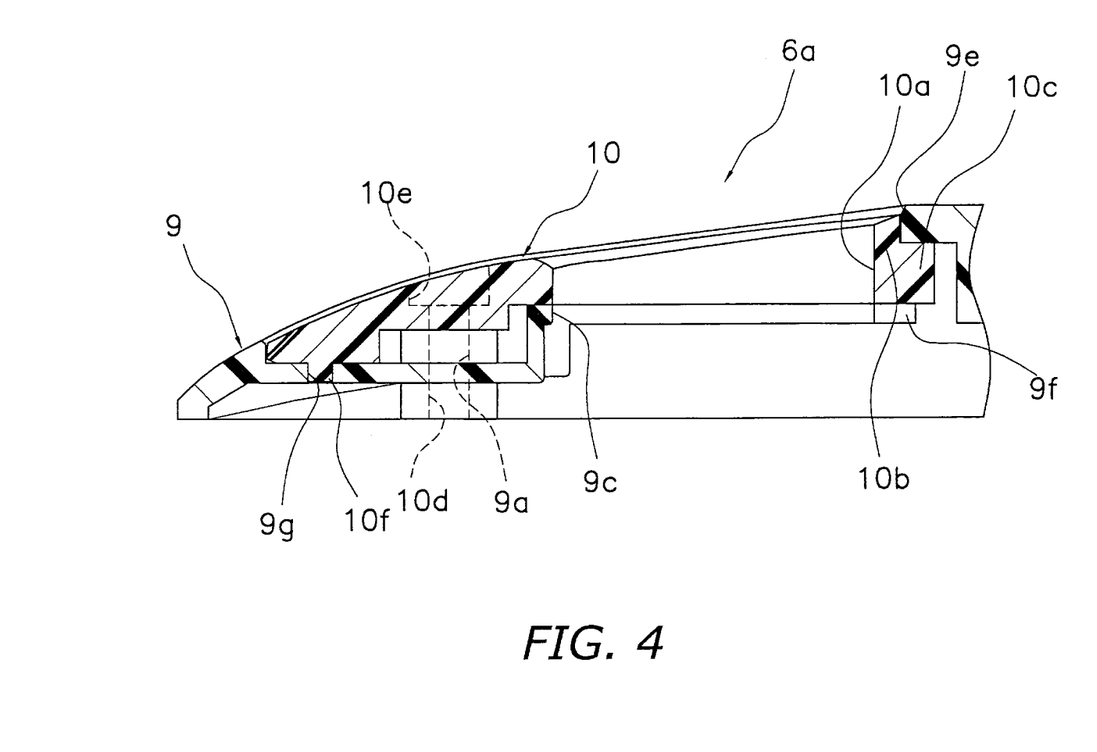
FIG. 4 is a cross-sectional view of FIG. 3 sectioned along a line IV-IV.

As illustrated in FIG. 4, the outer surface of the name plate 10 is slightly recessed than that of the cover body 9. An edge 9e of the attachment recess 9d of the cover body 9 is chamfered in a tapered shape. Therefore, a minute step is formed between the cover body 9 and the outer surface of the name plate 10. With the structure, the name plate 10 is inhibited from interfering with the edge of the attachment recess 9d of the cover body 9 in attaching the tapered name plate 10 having a roughly raindrop-like shape to the cover body 9. As a result, it is possible to maintain good design, and simultaneously enhance workability in attaching the name plate 10 to the cover body 9.

Figure 5:
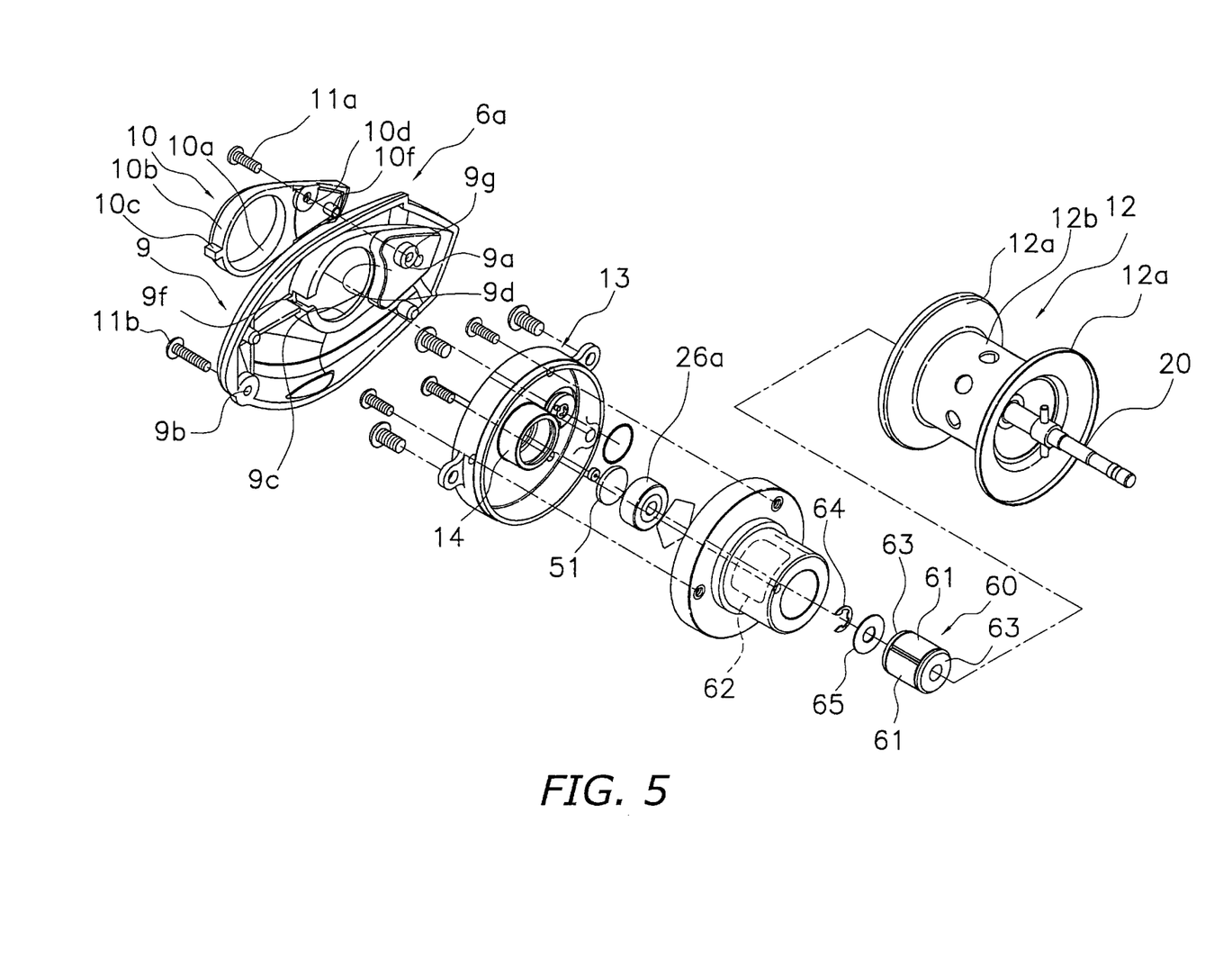
FIG. 5 is an exploded perspective view of a spool brake device of the dual-bearing reel.

As illustrated in FIGS. 4 and 5, the name plate 10 has a positioning protrusion 10f on the inner surface of the front part thereof. The positioning protrusion 10f is a columnar portion protruding towards the cover body 9. The positioning protrusion 10f is fitted into a positioning hole 9g penetrating through the cover body 9 from its outer surface to its inner surface. Accordingly, the front part of the name plate 10 is positioned with respect to the cover body 9.

As illustrated in FIG. 2, the spool 12 includes a pair of saucer-shaped flanges 12a on the both axial ends thereof. Further, the spool 12 includes a tubular bobbin trunk 12b between the both flanges 12a. To prevent the fishing line from getting stuck, the outer peripheral surface of the left-side flange 12a (see FIG. 2) is disposed on the inner peripheral side of the opening 8d at a slight clearance. The spool 12 is non-rotatably fixed to the spool shaft 20 penetrating the inner peripheral side of the bobbin trunk 12b by, for instance, serration coupling.

The spool shaft 20 is made of non-magnetic metal such as SUS 304. The spool shaft 20 extends to the outside of the second side cover 6b while penetrating through the second side plate 8b. The extended end of the spool shaft 20 is rotatably supported by a boss 6c attached to the second side cover 6b through a second bearing 26b. The spool shaft 20 has a large-diameter portion 20a in the axial center part thereof Further, the spool shaft 20 has first and second small-diameter portions 20b and 20c in the both axial ends thereof The first small-diameter portion 20b is supported by the first bearing 26a, while the second small-diameter portion 20c is supported by the second bearing 26b. It should be noted that the first and second bearings 26a and 26b are roller bearings. Each of the first and second bearings 26a and 26b includes a roller member, an inner race, and an outer race. These members are made of SUS404, and their surfaces are reformed for enhancing corrosion resistance of the first and second bearings 26a and 26b.

Further, the spool shaft 20 includes a magnet attachment portion 20d between the large-diameter portion 20a and the left-side first small-diameter portion 20b (see FIG. 2). The magnet attachment portion 20d has an outer diameter greater than that of the first small-diameter portion 20b and less than that of the large-diameter portion 20a. Magnets 61 to be described are attached to the magnet attachment portion 20d. A magnet holding portion 27 is non-rotatably fixed to the magnet attachment portion 20d by, for instance, serration coupling. For example, the magnet holding portion 27 is made of magnetic material obtained by performing electroless nickel plating with respect to the surface of iron material such as SUM (extrusion and cutting). The magnet holding portion 27 is a quadratic prism member with a square cross-section. The magnet holding portion 27 has a through hole 27a in the center part thereof. The magnet attachment portion 20d penetrates the through hole 27a. The fixation method of the magnet holding portion 27 is not limited to serration coupling, and a variety of coupling methods (e.g., key coupling, splined coupling, etc.) can be used as the fixation method.

The right end of the large-diameter portion 20a of the spool shaft 20 is disposed in the through-hole part of the second side plate 8b. An engaging pin 29 is fixed to the right end of the large-diameter portion 20a. The engaging pin 29 forms a part of the clutch mechanism 21. Further, the engaging pin 29 penetrates through the large-diameter portion 20a along its diameter. The both axial ends of the engaging pin 29 radially protruding from the large-diameter portion 20a.

As illustrated in FIG. 1, the clutch lever 17 is disposed behind the spool 12 while being disposed on the rear part of the space interposed between the first and second side plates 8a and 8b. The clutch lever 17 is coupled to the clutch control mechanism 22. The clutch lever 17 is configured to be slid up and down between the first and second side plates 8a and 8b for switching the clutch mechanism 21 between a coupled state and a decoupled state.

The gear mechanism 19 includes the handle shaft 30, a drive gear 31, and a pinion gear 32. The drive gear 31 is fixed onto the handle shaft 30. The pinion gear 32 is formed in a tubular shape and is meshed with the drive gear 31. The handle shaft 30 is rotatably attached to the second side plate 8b and the second side cover 6b. The handle shaft 30 is prevented from rotating in a fishing-line releasing direction (i.e., reversing) by a roller-type one-way clutch and a pawl-type one-way clutch (not illustrated in the figures). The drive gear 31 is rotatably attached to the handle shaft 30. The drive gear 31 is coupled to the handle shaft 30 through the drag mechanism 23.

The pinion gear 32 is a tubular member that the spool shaft 20 penetrates through the center part thereof. The pinion gear 32 extends axially outwards from the second side plate 8b. The pinion gear 32 is attached onto the spool shaft 20 while being axially movable. Further, the left end (see FIG. 2) of the pinion gear 32 is supported by the second side plate 8b through a bearing 33 while being rotatable and axially movable. The pinion gear 32 has an engaged groove 32a on the left end thereof (see FIG. 2). The engaged groove 32a is engaged with the engaging pin 29. The engaged groove 32a and the engaging pin 29 form the clutch mechanism 21. Further, the pinion gear 32 includes a narrowed portion 32b in the axially intermediate part thereof Yet further, the pinion gear 32 includes a gear portion 32c on the right end thereof The gear portion 32c is meshed with the drive gear 31.

The clutch control mechanism 22 includes a clutch yoke 35. The clutch yoke 35 is configured to be moved along the axial direction of the spool shaft 20. The clutch control mechanism 22 further includes a clutch return mechanism (not illustrated in the figures). The clutch return mechanism is configured to turn on the clutch mechanism 21 (i.e., a clutch-on state) in conjunction with rotation of the spool 12 in the fishing-line winding direction.

The casting control mechanism 24 includes a plurality of friction plates 51 and a brake cap 52. The friction plates 51 abut to the both ends of the spool shaft 20 from the axially outside of the spool shaft 20. The brake cap 52 is configured to regulate abutting pressure of the friction plates 51 against the spool shaft 20. The left-side friction plate 51 is attached to the inside of the spool support part 13.

Structure of Spool Brake Mechanism

As illustrated in FIGS. 2 and 5, the spool brake mechanism 25 includes a spool brake unit 40 (an exemplary spool brake unit), a spool control unit 42 (an exemplary spool control unit) and the mode knob 43. The spool brake unit 40 is disposed in the spool 12 and the reel unit 1. The spool control unit 42 is configured to electrically analog-control the spool brake unit 40 with one selected from four brake modes to be described. The mode knob 43 is used for selecting one of the four brake modes.

Structure of Spool Brake Unit

The spool brake unit 40 is an electrically controllable unit configured to brake the spool 12 by way of electric generation. The spool brake unit 40 includes a rotor 60 and a plurality of (e.g., four) coils 62. The rotor 60 includes a plurality of (e.g., four) magnets 61. The magnets 61 are aligned in the rotational direction of the spool shaft 20. The coils 62 are disposed on the outer peripheral side of the rotor 60 while being opposed to each other. Further, the coils 62 are connected in series. The spool brake unit 40 is configured to brake the spool 12 by causing the spool control unit 42 to analog-control electric current generated by the relative rotation of the magnets 61 and the coils 62.

The four magnets 61 of the rotor 60 are aligned in the circumferential direction of the rotor 60. Polarities of the adjacent magnets 61 are different from each other. The length of each magnet 61 is roughly the same as that of the magnet holding portion 27. The inner surface of each magnet 61 is flat, while the outer surface thereof has a circular-arc cross-section. The inner surface of each magnet 61 makes contact with the outer peripheral surface of the magnet holding portion 27 of the spool shaft 20. A pair of positioning members 63 is disposed on the both axial ends of the magnets 61 for appropriately positioning the magnets 61. The rotor 60 is retained by a retainer ring 64 and a washer 65.

The four magnets 61 are preliminarily mounted to an axis-aligning tool together with the magnet holding portion 27 and the positioning members 63. After adhesive is applied to contact surfaces among these members, these members are fixed while being tightly bound by an additional member from the outside. After these members are bonded to each other, the additional member is removed therefrom. Accordingly, the axes of the magnets 61 and the magnet holding portion 27 are aligned with the axis of the spool shaft 20. Therefore, the magnets 61 are not easily displaced. In other words, it is possible to inhibit occurrence of vibration due to deterioration in rotational balance during rotation of the spool 12. It should be noted that displacement of the magnets 61 can be prevented by press-fitting a ring member, made of largely deformable synthetic resin, onto the outer peripheral surface of the magnet assembly mounted to the axis-aligning tool instead of by fixation using adhesive. Further, only the four magnets 61 can be bonded while being mounted to the axis-aligning tool.

As illustrated in FIG. 2, a sleeve 68 is mounted to the inner peripheral surface of the bobbin trunk 12b while being opposed to the magnets 61. For example, the sleeve 68 is a magnetic member formed by performing the electroless nickel plating with respect to the surface of iron material such as SUM (extrusion and cutting). The sleeve 68 is fixed to the inner peripheral surface of the bobbin trunk 12b by arbitrary fixing means (e.g., press-fitting, bonding, etc.). When the structured magnetic sleeve 68 is opposed to the magnets 61, the magnetic flax from the magnets 61 concentrates in and passes through the coils 62. Accordingly, electric generation efficiency and brake efficiency will be enhanced.

Coreless coils are used as the coils 62 for preventing cogging and thereby smoothly rotating the spool 12. Further, the coils 62 are not provided with a yoke. Wires of the coils 62 are respectively wound in a roughly rectangular shape. The wound wires are opposed to the magnets 61 while being disposed within the magnetic field of the magnets 61. The four coils 62 are connected in series while the both ends thereof are connected to the spool control unit 42. The coils 62 are disposed substantially concentrically to the axis of the spool 12 while being curved in a circular-arc shape along the rotational direction of the spool 12. Accordingly, a roughly constant distance is produced between the coils 62 and the outer surfaces of the magnets 61. In other words, it is possible to keep a constant clearance between the coils 62 and the rotating magnets 61. The coils 62 are also mounted to a circuit board 70 of the spool control unit 42.

The mode knob 43 is provided for selecting any one of four brake modes. Specifically, the four brake modes are L-mode (long distance mode), M-mode (medium distance mode), A-mode (all-round mode) and W-mode (wind mode). First and second braking forces to be described are set for each of the four brake modes. Here, the first braking forces for the four modes are different from each other. Likewise, the second braking forces for the four modes are different from each other.

Now, the L-mode is a long distance mode used for performing super-distance surf-casting in a preferable downwind condition while the fishing line with low specific gravity and a heavy terminal tackle (lure) with less air resistance (e.g., a spoon lure, a metal jig, a vibration lure, etc.) are used. The L-mode is a brake mode configured to prolong flying distance of the terminal tackle by maximally using energy immediately after casting, maximally increasing the maximum number of rotations per unit time of the spool 12, and making the spool 12 almost freely rotate in the middle and subsequent stages of the casting. The first braking force (to be described) of the L-mode is set to be the smallest in the four brake modes.

The M-mode is a brake mode set for comfortably performing normal long distance surf-casting with a terminal tackle (plug) with less air resistance (e.g., a movable-centroid type plug, a pencil bait, and a vibration plug). The M-mode is set for prolonging flying distance of the terminal tackle while overrun is inhibited immediately after casting and backlash is narrowly prevented by appropriately correcting rotation of the spool 12 in the middle and subsequent stages of the casting. It is preferable to select the M-mode as the default mode when the polyamide resin fishing line with low specific gravity is used.

The A-mode is a brake mode set for maximally using energy immediately after casting and prolonging flying distance of the terminal tackle in the later stage of the casting. Regardless of a sort of fishing line, a sort of terminal tackle, and a wind direction, the A-mode can be used in almost all conditions. Especially, it is preferable to set the A-mode as the default mode when the fluorocarbon fishing line with high specific gravity is used.

The W-mode is a brake mode set for prolonging flying distance of the terminal tackle by inhibiting backlash as much as possible even when the flying distance of the terminal tackle can be reduced in a completely upwind condition. The second braking force of the W-mode is set to be the largest in the four brake modes. The W-mode is set to be suitable for casting a predetermined type of tackle that easily rotates and slows down in flying (e.g., a fixed-centroid type Minnow lure and a flat-side crankbait) in an upwind condition. Further, the W-mode is set for reliably preventing backlash even in low-speed rotation of the spool 12 even in short-distance casting (e.g., pitching casting and skipping casting).

The mode knob 43 is rotatably mounted to the first side cover 6a. The mode knob 43 can be positioned in any one of four rotation phases corresponding to the aforementioned four brake modes. The mode knob 43 is provided with a magnet (not illustrated in the figures). The circuit board 70 is provided with a knob position sensor 45 (see FIG. 6). The knob position sensor 45 includes two hall elements. The hall elements are disposed in a circulation area of the magnet, and are separated away from each other. The knob position sensor 45 is configured to detect the rotation phase of the mode knob 43 based on a switching of the two hall elements caused by passing of the magnet. Specifically, the switching states of the hall elements include "a both-on state", "a one-on and the other-off state", "a one-off and the other-on state" and "a both-off state". A digital control part 55 to be described is configured to set any of the four brake modes on the basis of the detected rotation phase.

Structure of Spool Control Unit

The spool control unit 42 is mounted on the circuit board 70 illustrated in FIG. 2. The circuit board 70 is a ring-shaped washer-type board including a circular opening in the center thereof. The circuit board 70 is disposed on the outer peripheral side of the bearing accommodating portion 14. Further, the circuit board 70 is disposed substantially concentrically to the spool shaft 20. The circuit board 70 is fixed to the spool support part 13 by screws. The circuit board 70, together with the coils 62, is covered with a hard insulator film made of synthetic resin. Therefore, the coils 62 and the circuit board 70 are formed in a brimmed tubular shape. The circuit board 70 is mounted to a surface of the spool support part 13 that is opposed to the flange 12a of the spool 12.

The coils 62 can be herein directly mounted to the circuit board 70 while being disposed in the surrounding of the rotor 60 due to the structure that the circuit board 70 is mounted to the spool support part 13 surface opposed to the flange portion 12a of the spool 12. Accordingly, lead wires are not required for connecting the coils 62 and the circuit board 70. Therefore, it is possible to reduce chances of insulation failure between the coils 62 and the circuit board 70. In addition, the coils 62 are mounted to the circuit board 70 attached to the spool support part 13. Therefore, only by mounting the circuit board 70 to the spool support part 13, the coils 62 are also mounted to the spool support portion 13. Thus, the spool brake mechanism 25 can be easily assembled.

It should be noted that a variety of elements such as the coils 62 mounted to the circuit board 70 are covered with an insulator film 90 made of synthetic resin insulator. The insulator film 90 is formed in a brimmed cylindrical shape and covers the coils 62, the circuit board 70 and electric components mounted to the circuit board 70.

Figure 6:
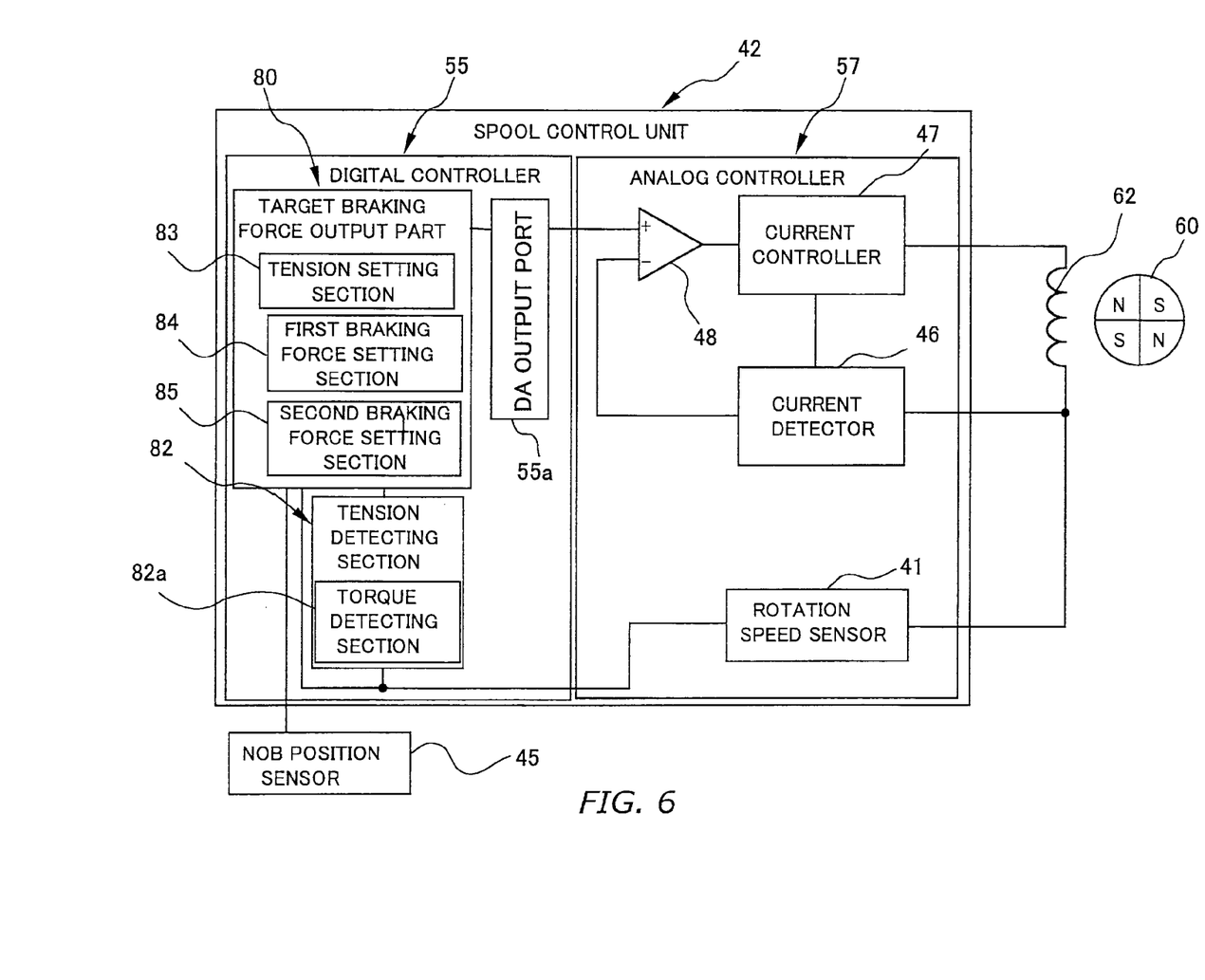
FIG. 6 is a block diagram of the spool brake device.

As illustrated in FIG. 6, the spool control unit 42 includes a digital controller 55 and an analog controller 57. Further, the spool control unit 42 includes an electric storage element (not illustrated in the figures). Electric power generated by the rotation of the spool 12 is stored in the electric storage element. The spool control unit 42 is actuated by the electric power stored in the electric storage element.

The digital controller 55 is implemented by a microcomputer embedded with, for instance, a CPU, a RAM, a ROM, an I/O interface and etc. The microcomputer includes a DA (digital/analog) output port 55a. The DA output port 55a is configured to convert a digital signal into an analog signal. The ROM of the digital controller 55 stores a target braking force output program and a variety of items to be described (first braking force, second braking force, timer value, and etc.). The digital controller 55 includes a target braking force output part 80 and a tension detecting part 82 as functional elements to be implemented by the target braking force output program. The target braking force output part 80 includes a tension setting section 83, a first braking force setting section 84, and a second braking force setting section 85. Reference tension Fr is set in the tension setting section 83. The reference tension Fr varies on the basis of the elapsed time since the starting of casting whereby the spool 12 starts rotating in the fishing-line releasing direction. First braking force TF1 is set in the first braking force setting section 84. Second braking force TF2 is set in the second braking force setting section 85. The second braking force TF2 is braking force obtained by increasing/decreasing the first braking force TF1 by a predetermined amount. The first braking force TF1 is target braking force to be set when the detected tension F exceeds the reference tension Fr. The second braking force TF2 is target braking force to be set when the detected tension F is less than or equal to the reference tension Fr. It should be noted that the reference tension Fr, the first braking force TF1 and the second braking force TF2 are set for the four brake modes to be detected by the knob position sensor 45 on a mode-by-mode basis.

The tension detecting part 82 includes a torque detecting section 82a. The torque detecting section 82a is configured to detect torque on the basis of variation in rotation speed ω of the spool 12 detected by a rotation speed detector 41 to be described. The analog controller 57 and the knob position sensor 45 are connected to the digital controller 55. Using a target speed calculating program, the digital controller 55 is configured to calculate target braking force on the basis of the spool rotation speed obtained by the knob position sensor 45 and the analog controller 57. A dynamic signal, indicating the calculated target braking force, is output in the form of analog voltage to the analog controller 57 through the DA output port 55a.

The analog controller 57 includes the rotation speed detector 41 (an exemplary rotation speed detecting unit) configured to detect the rotation speed of the spool 12, a current detector 46 (an exemplary electric current detecting part), a current controller 47 (an exemplary electric current control part), and an operational amplifier 48 (an exemplary differential data output part). The rotation speed detector 41 is connected to the coils 62. The rotation speed detector 41 is configured to generate a pulse signal that indicates frequency of rotation of the spool 12 on the basis of electric current output from the coils 62. The current detector 46 is provided with, for instance, a resistor. The current detector 46 is connected to the coils 62. The current detector 46 is configured to convert a value of the electric current output from the coils 62 into a value of voltage. The current controller 47 is connected to the current detector 46 and the operational amplifier 48. The current controller 47 is provided with, for instance, two field effect transistors (FETs). The gate of the current controller 47 is connected to the operational amplifier 48. The current controller 47 is configured to control electric current output from the coils 62 by a voltage signal to be output from the operational amplifier 48. Accordingly, electric current output from the coils 62 is controlled to be the level of the target braking force. The operational amplifier 48 includes a positive terminal and a negative terminal. The analog voltage, which indicates the target braking force, is output from the digital controller 55 and is inputted into the positive terminal. On the other hand, voltage output from the coils 62 is inputted into the negative terminal after converted in the current detector 46. The operational amplifier 48 is configured to output a voltage signal to the gate of the current controller 47 on the basis of differential voltage (an exemplary differential data) between the analog voltage output from the digital controller 55 (which is then regulated to be the level of the target braking force) and the voltage inputted therein from the coils 62 via the current detector 46. The voltage signal is a signal set for regulating the voltage output from the coils 62 to be equal to the voltage output from the digital controller 55 on the basis of the target braking force. The current controller 47 is configured to control the electric current output from the coils 62 on the basis of a control signal output from the operational amplifier 48 in order to regulate the voltage output from the coils 62 to be the level of the target braking force.

Operation and Action of Actual Fishing

In casting, the clutch lever 17 is pressed down for switching the clutch mechanism 21 into a clutch-off state. In the clutch-off state, the spool 12 can be freely rotated. When casting is performed under the condition, the fishing line is reeled out of the spool 12 with high momentum due to the weight of the terminal tackle. When the spool 12 is rotated in casting, the magnets 61 are circulated on the inner peripheral side of the coils 62. Accordingly, target braking force corresponding to the selected one of the brake modes is output from the digital controller 55 to the analog controller 57. In response, the analog controller 57 controls the output current from the coils 62 to be the level of the target braking force. In this way, the spool 12 is braked. In casting, the rotation speed of the spool 12 gradually increases and then gradually decreases after reaching its peak.

When the terminal tackle lands in the water, an angler rotates the handle 2 in the fishing-line winding direction. Accordingly, the clutch mechanism 21 is switched into the clutch-on state by the clutch return mechanism (not illustrated in the figures). An angler waits for fish bite the bait while holding the reel unit 1 in the palm under the condition.

Control Action of Digital Controller

Next, a series of actions of outputting a target braking force TF, which is performed by the digital controller 55 in casting, will be schematically explained with reference to FIG. 7. It should be noted in FIG. 7 that voltage indicating intensity of braking force, tension and rotation speed are represented in the vertical axis while elapsed time since casting is represented in the horizontal axis. Further, voltage with the level of the target braking force, which is to be actually output, is depicted with a bold solid line.

When casting is started and the digital controller 55 is powered on, a variety of items are set in the digital controller 55 on the basis of the position of the mode knob 43. The items include first initial braking force (a voltage value V1S) uniquely set for each brake mode in a first brake processing to be described, second initial braking force (a voltage value V2S) uniquely set for each brake mode in a second brake processing to be described; a magnification MP (e.g., in a range of 1.2× to 2.5×) for the second braking force TF2, an attenuation rate RA (e.g., 0.2 to 0.6) for the second braking force TF2, and a timer value (e.g., in a range of 0.05 to 0.5 seconds) of a timer TN in correction braking. In addition, the reference tension Fr and starting tension Fs are set in the digital controller 55. The reference tension Fr is used as a reference with respect to detected tension F, whereas the starting tension Fs is used for determining the timing when braking is started with the first braking force TF1. It should be noted that FIG. 7 is explained where the magnification MP whereby the second braking force TF2 is increased by that much is set to be to be 1.5, for instance.

Next, the tension detecting part 82 is configured to calculate the tension F based on the rotation speed ω from the rotation speed detector 41.

The tension F can be herein calculated by a change rate ($\Delta\omega/\Delta t$) of the rotation speed of the spool 12 and moment of inertia J of the spool 12. When the rotation speed of the spool 12 varies in casting, the rotation speed is different from the rotation speed of the spool 12 independently and freely rotating without receiving tension from the fishing line. The difference is attributed to the rotational driving force (i.e., torque) generated by tension from the fishing line. A driving torque T can be herein expressed with the following equation (1), where the change rate of the rotation speed is set to be "Δω/Δt".

$$T = J \times (\Delta\omega/\Delta t) \quad (1)$$

When the driving torque T is calculated by the equation (1), the tension detecting part 82 is configured to calculate the tension F based on the radius about a point of action of the fishing line (normally 15 to 20 mm).

Further, the following finding was obtained. A terminal tackle flips its position and stably flies before the rotation speed of the spool 12 reaches its peak, if large braking force is applied to the spool 12 when the tension F, which gradually is decreasing since the start of casting, becomes less than or equal to a predetermined value (i.e., the starting tension Fs). The following control is executed for allowing the terminal tackle to fly with a stable position by braking the spool 12 before the rotation speed of the spool 12 reaches its peak. Specifically, the first brake processing is executed for flipping the position of the terminal tackle by applying the voltage value V1S of the strong constant first initial braking force for a short period of time in the beginning of casting. Subsequently, the second brake processing is executed and the digital controller 55 is herein configured to output target braking force TF until the rotation speed of the spool 12 is reduced to a predetermined rotation speed ωe. The target braking force TF is herein obtained by the combination of the gradually decreasing first braking force TF1 and the second braking force TF2. A voltage V2 of the first braking force TF1 herein decreases from the voltage value V2S of the second initial braking force in proportion to square of the rotation speed of the spool 12. Further, a voltage AV1 of the second braking force TF2 decreases at the set attenuation rate RA from an initial value (TF2=(MP+1)×TF1) obtained by multiplying the voltage V2 of the first braking force TF1 by a predetermined magnification MP.

In the second brake processing, comparison is made between the reference tension Fr set to at least temporarily decrease over time and the tension F detected by the tension detecting part 82. When the detected tension F becomes less than or equal to the reference tension Fr, the voltage AV1 corresponding to the second braking force TF2 is output as a voltage of the target braking force TF. The second braking force TF2 is obtained by increasing the first braking force TF1 by a predetermined value and attenuates at the attenuation rate RA. Specifically, the timer TN (N=1, 2, 3 . . . ) are actuated every time the detected tension F becomes less than or equal to the reference tension Fr. When the timer TN finishes counting, the spool 12 is braked with the second braking force TF2. The second braking force TF2 is herein obtained by increasing, by a predetermined amount, the first braking force TF1 at the moment when the timer TN finishes counting. It should be noted that the timer TN is configured to be reset when the detected tension F exceeds the reference tension Fr before the timer TN finishes counting. In this case, the spool 12 is braked with the first braking force TF1 without being braked with the second braking force TF2.

Figure 7:
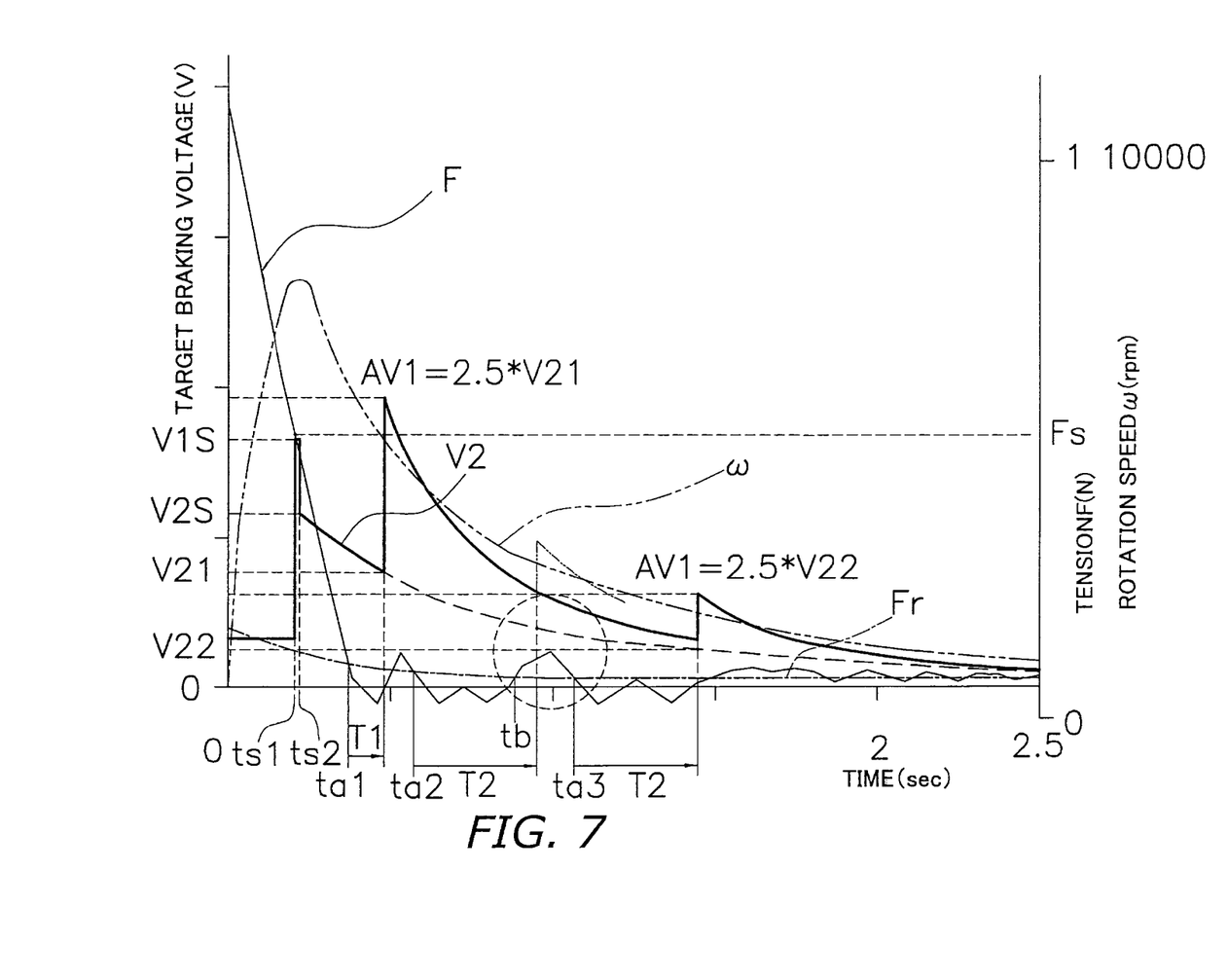
FIG. 7 is a chart representing the control action of the spool brake device.

In FIG. 7, for instance, the detected tension F becomes less than or equal to the reference tension Fr at a time point ta1 when a timer T1 starts counting. Subsequently, the detected tension F remains less than or equal to the reference tension Fr until the timer T1 finishes counting. Therefore, the voltage AV1 of the second braking force TF2 is output as the voltage of the target braking force TF when the timer T1 finishes counting. The second braking force TF2 is herein obtained by increasing by a predetermined amount a voltage V21 of the first braking force TF1 at the moment when the timer T1 finishes counting. Similarly, the detected tension F becomes less than or equal to the reference tension Fr at a time point ta2. In this case, however, the detected tension F exceeds the reference tension Fr at a time point tb before a timer T2 finishes counting as represented within a circle depicted with a broken line in FIG. 7. Therefore, output of the voltage of the second braking force TF2 is cancelled, and the voltage of the first braking force TF1 is output as the voltage of the target braking force TF. The voltage of the first braking force TF1 herein gradually decreases from the voltage value V2S of the second initial braking force. Further, the detected tension F becomes less than or equal to the reference tension Fr again at a time point ta3. Subsequently, the detected tension F remains less than or equal to the reference tension Fr until the timer T2 finishes counting. Therefore, the voltage AV1 of the second braking force TF2 is output as the voltage of the target braking force TF. The voltage AV1 is herein obtained by increasing, by a predetermined amount, a voltage value V22 of the first braking force TF1 at the moment when the timer T2 finishes counting. As described above, the second braking force TF2 attenuates at the attenuation rate RA over time. Further, the second braking force TF2 does not become less than or equal to the first braking force TF1.

Figure 8:
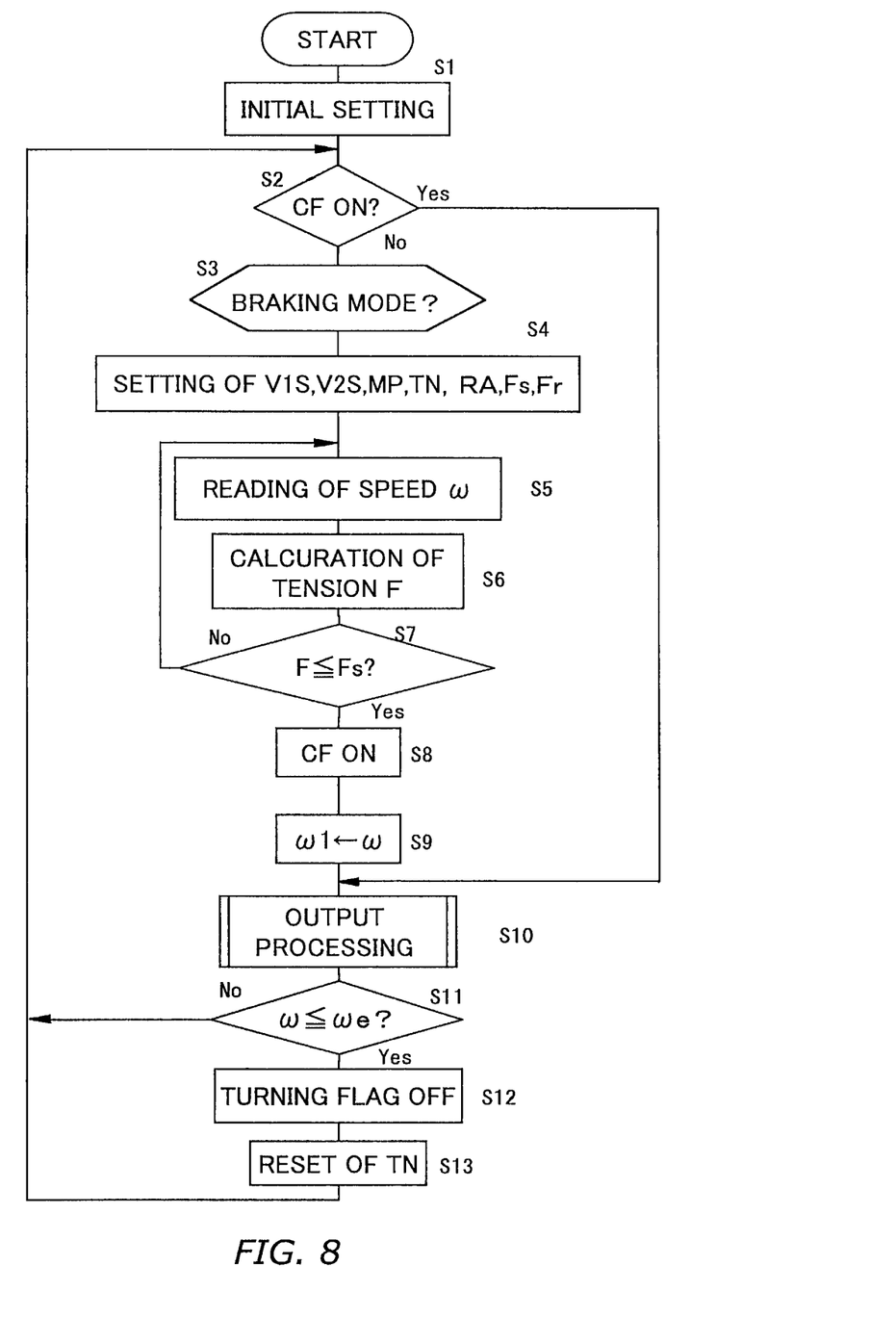
FIG. 8 is a flowchart representing a main routine of the control action of the spool brake device.

Next, a target braking force output processing will be specifically explained with reference to control flowcharts represented in FIGS. 8 and 9.

When the spool 12 is rotated in casting and electric power is stored in an electric storage element, the digital controller 55 is powered on and an initial setting is executed in Step S1. Further, a variety of flags and variables are herein reset. For example, a variable N, indicating actuated frequency of the timer TN, is set to be "1". In Step S2, it is determined whether or not a flag CF has been turned on. The flag CF herein indicates whether or not an output processing to be described has been started. The processing proceeds to Step S3 when it is determined that the output processing has not been started yet in Step S2. In Step S3, it is determined which of brake modes BMn ("n" is any one of the integers 1 to 4) is selected by the knob position sensor 45. In Step S4, the brake mode is set to be the selected one of the brake modes BMn. Specifically, a variety of values associated with the selected one of the brake modes BMn are read out from the ROM of the digital controller 55 and is set in the RAM of the microcomputer. For example, the values associated with the selected one of the brake modes BMn include the voltage value V1S of the first initial braking force in the first brake processing, the voltage value V2S of the second initial braking force in the second brake processing, the magnification MP of the second braking force TF2, respective timer values of the timer TN, the attenuation rate RA of the second braking force TF2, and the reference tension Fr used for braking with the second braking force TF2. It should be noted that the voltage value V1S of the first initial braking force, which is stored in the ROM and is set for the first time, is a voltage value where the rotation speed of the spool 12 is 10,000 rpm in the initial stage of casting. Therefore, the voltage value V1S of the first initial braking force is corrected during the control on the basis of the rotation speed ω of the spool 12 in the initial stage of casting. The timer TN (N: positive integer) is used as a plurality of timers configured to be sequentially actuated when the spool 12 is braked with the second braking force in the second brake processing. The timer values of the plural timers are set to be sequentially longer. For example, the timer value of the timer T1 is set to be 0.05 seconds, whereas the timer value of the timer T2 is set to be 0.1 seconds.

In Step S5, the rotation speed ω of the spool 12 is detected based on a pulse from the rotation speed detector 41. In Step S6, the tension detecting part 82 calculates the tension F acting on the fishing line reeled out from the spool 12 based on the rotation speed ω.

In Step S7, it is determined whether or not the calculated tension F is less than or equal to the starting tension Fs (e.g., a value within a range of 0.5 to 1.5N). The processing returns to Step S5 when the calculated tension F is greater than the starting tension F.

The processing proceeds to Step S8 when the tension F becomes less than or equal to the predetermined value (starting tension) Fs. In Step S8, the flag CF is turned on. In Step S9, the rotation speed ω recently detected in Step S5 is set as a rotation speed ω1 in the initial stage of casting. In Step S10, the output processing represented in FIG. 9 is executed. In Step S11, it is determined whether or not the detected rotation speed ω reaches an ending rotation speed ωe. The ending rotation speed is remarkably low speed at which the control ends. When it is determined that the rotation speed ω reaches the ending rotation speed ω in Step S11, the processing proceeds to Step S12 and all the flags are turned off. The processing then proceeds to Step S13 and all the timers (i.e., timer TN) are reset in Step S13, and the processing returns to Step S2. However, the CPU of the digital controller 55 is reset when casting is finished and rotation of the spool 12 is accordingly stopped. This is because voltage of the power source is reduced and the electric storage element is thereby discharged.

When it is determined that the flag CF has been turned on in Step S2 and the brake processing has been started, the processing skips ahead to Step S10.

Figure 9:
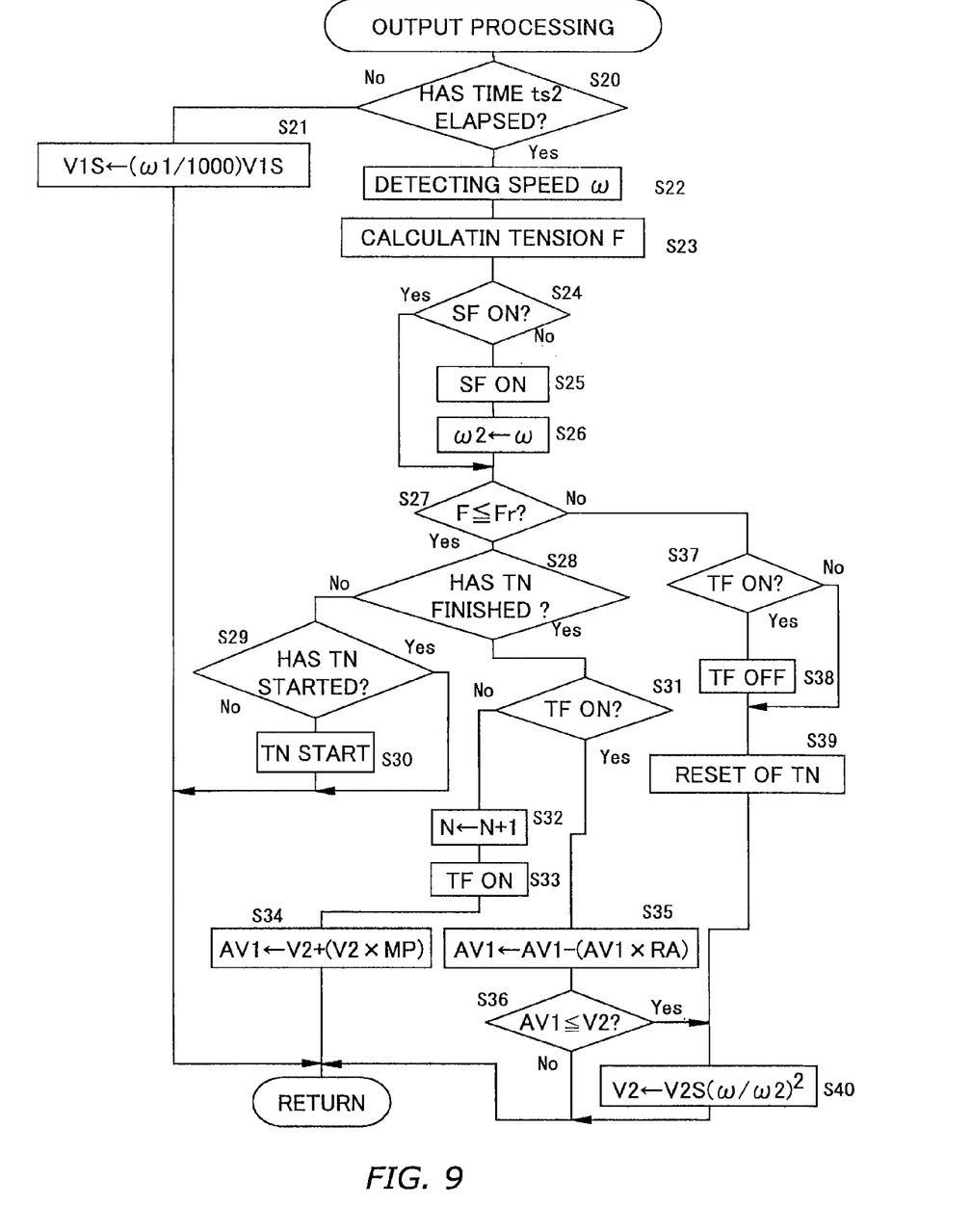
FIG. 9 is a flowchart representing an output processing routine of the spool brake device.

In the output processing of Step S10, it is firstly determined whether or not a time ts2 has been elapsed after the detected tension F becomes less than or equal to the predetermined value Fs in Step S20 in FIG. 9. The processing proceeds to Step S21 unless the time ts2 is elapsed. In Step S21, the first brake processing is executed, and the processing returns to Step S11. In the first brake processing of Step S21, the voltage value V1S, which is set in Step S4, of the first initial braking force is corrected on the basis of the rotation speed ω1 in the initial stage of casting as represented in FIG. 7, and the spool 12 is braked with constant braking force until the time ts2 is elapsed.

When it is determined that the time ts2 has been elapsed since starting of braking in Step S20, the processing proceeds to Step S22 and the second brake processing is executed. In Step S22, the rotation speed ω is detected. Next in Step S23, the tension F is calculated. Next in Step S24, it is determined whether or not a flag SF has been turned on. The flag SF is a flag for determining whether or not the second brake processing has been started. When it is determined that the flag SF has not been turned on yet in Step S24, the processing proceeds to Step S25 and the flag SF is turned on. Next in Step S26, the rotation speed ω detected in Step S22 is set as an initial rotation speed ω2 in the second brake processing, and the processing proceeds to Step S27. On the other hand, when it is determined that the flag SF has been turned on in Step S24, in other words, when the second brake processing has been started, the processing proceeds to Step S27.

In Step S27, it is determined whether or not the detected tension F becomes less than or equal to the reference tension Fr. When it is determined that the detected tension F becomes less than or equal to the reference tension Fr in Step S27, the processing proceeds to Step S28 for outputting the second braking force. In Step S28, it is determined whether or not the timer TN (the first one is the timer T1) has finished counting. When it is determined that the timer TN has not finished counting yet in Step S28, the processing proceeds to Step S29.

In Step S29, it is determined whether or not the timer TN has started counting. When it is determined that the timer TN has not started counting yet in Step S29, the processing proceeds to Step S30. In Step S30, the timer TN is actuated for starting counting and the processing returns to the main routine. When it is determined that the timer TN has started counting in Step S29, the processing skips Step S30 and returns to the main routine.

When it is determined that the timer TN has finished counting in Step S28, the processing proceeds to Step S31. In Step S31, it is determined whether or not a flag TF has been turned on. The flag TF herein indicates whether or not a correction brake processing is the one executed when the detected tension F becomes less than or equal to the reference tension Fr for the first time. When it is determined that the flag TF has not been turned on yet in Step S31, this is the first time for the correction brake processing. Therefore, the processing proceeds to Step S32 and the variable N is incremented by 1 for preparing the next timer TN (e.g., timer T2). Next in Step S33, the flag TF is turned on. Next in Step S34, the voltage AV1 of the second braking force TF2 is set and the processing returns to the main routine. As illustrated in FIG. 7, the voltage AV1 of the second braking force TF2 is set by multiplying a voltage value V21 of the first braking force TF1 when the timer TN finishes counting by the magnification MP (e.g., 1.5) and then adding the multiplied voltage value V2 to the voltage V2 of the first braking force When it is determined that the flag TF has been turned on in Step S31, on the other hand, the processing proceeds to Step S35 and an attenuation processing of the second braking force TF1 is executed. Specifically, new voltage AV1 of the second braking force TF2 is set by multiplying the voltage value AV1 of the second braking force TF2 at that time by the predetermined attenuation rate RA and subtracting the multiplied voltage value AV from the voltage value AV1 of the second braking force TF2 at that time. Next in Step S36, it is determined whether or not the voltage AV1 of the attenuated second braking force TF2 is less than or equal to the voltage V2 of the first braking force TF1 in order to prevent the second braking force TF2 from becoming weaker than the first braking force TF1. When it is determined that the voltage AV1 of the second braking force TF2 is less than or equal to the voltage V2 of the first braking force TF1 in Step S36, the processing proceeds to Step S40 and the voltage of the first braking force TF1 is output.

When it is determined that the detected tension F is greater than the reference tension Fr in Step S27, on the other hand, the processing proceeds to Step S37. In Step S37, it is determined whether or not the flag TF has been turned on, in other words, whether or not the correction brake processing has been executed. When it is determined that the correction brake processing has been executed in Step S37, the processing proceeds to Step S38 and the flag TF is turned off. When it is determined that the correction brake processing has not been executed yet in Step S37, the processing skips the Step S38. Next in Step S39, the timer TN is reset and initialized. When the detected tension F exceeds the reference tension Fr before the timer TN is reset, the brake processing with the second braking force is thus configured to be cancelled while the timer TN is prevented from finishing counting.

Next in Step S40, the output processing of the first braking force TF1 is executed. Then, the processing returns to the main routine. In the output processing of the first braking force TF1, a voltage to be output is obtained by reducing the second initial braking force V2S by square of the rotation speed of the spool 12 (i.e., $V2=V2S(\omega/\omega 2)^2$).

In the present exemplary embodiment, the weak first braking force TF1 is output when the detected tension F exceeds the reference tension Fr. On the other hand, the strong second braking force TF2, obtained by increasing the first braking force TF1 by a predetermined amount, is output when the detected tension F becomes less than or equal to the reference tension Fr. Therefore, strength of the braking force is automatically controlled on the basis of a fishing condition. In other words, it is not required to reset strength of the braking force even when the fishing condition varies to some extent.

The analog controller 57 is configured to be actuated when the voltage depending on the first initial braking force V1S, the first braking force TF1 or the second braking force TF2 is output from the digital controller 55 by the aforementioned output processing of the digital controller 55. In the analog controller 57, the operational amplifier 48 is configured to output an output signal to the current controller 47 depending on a difference between the voltage value output from the digital controller 55 as the target braking force and the voltage value of current output from the coils 62. Thus, the analog controller 57 controls output current of the coils 62 to be the level of the target braking force.

In the present exemplary embodiment, voltage data for obtaining the target braking force by digital control is created and output as analog voltage. Further, the output value and an analog output value of the coils 62 are compared, and the output current of the coils 62 is analog-controlled based on the data depending on the difference. With the analog control thus configured, output current can be accurately controlled to be the level of the target braking force. Therefore, it is possible to apply stable braking force to the spool for obtaining the target braking force even when sizes and attachment positions of the magnets 61 and the coils 62 vary and this results in variation in electromotive force of the coils 62.

Other Exemplary Embodiments (a) In the aforementioned exemplary embodiment, tension acting on the fishing line is calculated based on the rotation speed of the spool. However, tension can be directly detected, for instance, by a strain gauge attached onto the spool shaft.

(b) In the aforementioned exemplary embodiment, the spool is braked by the second brake processing with the second braking force gradually attenuating with time. However, the spool can be braked with the constant second braking force for a predetermined period of time. Further, the second braking force can attenuate on the basis of square of the rotation speed.

(c) In the aforementioned exemplary embodiment, the spool is braked by the combination of: the first brake processing of braking the spool with constant braking force; and the second brake processing of braking the spool with varying braking force. In the present invention, however, the configuration of braking the spool is not limited to the above. The spool can be braked only by the second brake processing.

(d) In the aforementioned exemplary embodiment, a plurality of reference tensions can be set on the basis of a plurality of first braking forces.

(e) In the aforementioned exemplary embodiment, the microcomputer of the digital controller 55 includes the DA output port 55a. However, the microcomputer can not include any DA output port. In this case, the digital target braking force, output from the digital controller 55, can be pulse-width modulated and output. Then, the PWM (pulse-width modulation) output can be converted into analog voltage using a low-pass filter (LPF). Further, the analog voltage can be applied to either the operational amplifier or the current controller.

(f) In the aforementioned exemplary embodiment, the analog controller 57 includes the operational amplifier 48. However, the analog controller 57 can not include any operational amplifier. When the microcomputer of the digital controller includes an AD (analog/digital) input port, for instance, software in the microcomputer can implement functions of the operational amplifier.

(g) In the aforementioned exemplary embodiment, the target braking force is obtained by the digital controller 55 including the microcomputer. In the present invention, however, configuration of obtaining the target braking force is not limited to the above. For example, the target braking force can be obtained using either a digital circuit or an analog circuit. In this case, either the digital circuit or the analog circuit is configured to generate predetermined voltage as the target braking force depending on the rotation speed of the spool and the amount of change in the rotation speed.

Features (A) The spool brake mechanism 25 is configured to electrically brake the spool 12 that is rotatably mounted to the reel unit 1 of the dual-bearing reel and is allowed to wind the fishing line thereabout. The spool brake mechanism 25 includes the spool brake unit 40, the tension detecting part 82 and the spool control unit 42. The spool brake unit 40 includes the magnets 61 and the coils 62. The magnets 61 are configured to circulate in conjunction with the rotation of the spool 12. The coils 62, which are opposed to the magnets 61, are configured to generate electric current on the basis of circulation of the magnets 61. The tension detecting part 82 is configured to detect the tension acting on the fishing line. The spool control unit 42 is configured to control the spool brake unit 40 by analog-controlling the electric current flowing through the coils 62 on the basis of the tension detected by the tension detecting part 82.

In the spool brake mechanism 25, the output current of the coils 62 of the spool brake unit 40 is analog-controlled on the basis of the detected tension F. Under the analog control, the output current can be accurately controlled to be the level of the target braking force. Therefore, stable braking force can be applied to the spool 12 even when sizes and attachment positions of the magnets 61 and the coils 62 vary and this results in variation in electromotive force of the coils 62.

(B) The spool brake mechanism 25 further includes the rotation speed detector 41 configured to detect the rotation speed of the spool 12. The tension detecting part 82 includes the torque detecting section 82a configured to detect the torque for rotating the spool 12 based on the change rate of the rotation speed detected by the rotation speed detector 41. The tension detecting part 82 is configured to detect tension based on the calculated torque. In this case, tension can be detected by variation in the rotation speed of the spool 12. Therefore, rotation speed and tension can be both detected by a single detecting part.

(C) In the spool brake mechanism 25, the spool control unit 42 includes the target braking force output part 80, the current detector 46, the operational amplifier 48, and the current controller 47. The target braking force output part 80 is configured to calculate the desired target braking force TF on the basis of the rotation speed detected by the rotation speed detector 41 and the tension F detected by the tension detecting part 82 and output analog target voltage on the basis of the target braking force TF. The current detector 46 is configured to detect the current output from the coils 62 and convert the detected current into analog detection voltage. The operational amplifier 48 is configured to output differential data on the basis of a potential difference between the target voltage and the detected detection voltage. The current controller 47 is configured to control the current output from the coils 62 based on the output differential data for regulating voltage output from the coils 62 to be the target voltage.

In this case, electric current is controlled for regulating the voltage output from the coils 62 to be the target voltage based on the differential data on the basis of the potential difference between the analog target voltage and the analog voltage output from the coils 62. Thus, braking force can be stabilized by controlling electric current based on the differential data of voltage.

(D) In the spool brake mechanism 25, the target braking force output part 80 further includes the tension setting section 83, the first braking force setting section 84 and the second braking force setting section 85. The tension setting section 83 is configured to set the reference tension Fr varying on the basis of a period of time elapsed since rotation of the spool 12 is started. The first braking force setting section 84 is configured to set the first braking force TF1. The second braking force setting section 85 is configured to set the second braking force TF2 obtained by increasing the first braking force TF1 by a predetermined amount. When braking is started, the target braking force output part 80 is configured to set the first braking force TF1 as the target braking force and output target voltage on the basis of the first braking force TF1. When the tension F detected by the tension detection part 82 subsequently becomes less than or equal to the reference tension Fr, the target braking force output part 80 is configured to set the second braking force TF2 as the target braking force and output target voltage on the basis of the second braking force TF2.

In this case, the spool 12 is braked with the weak first braking force TF1 when the detected tension F is greater than the reference tension Fr. On the other hand, the spool 12 is braked with the strong second braking force TF2 obtained by increasing the first braking force TF1 by a predetermined mount when the detected tension F becomes less than or equal to the reference tension Fr. Therefore, strength of the braking force is automatically controlled depending on a fishing condition. In other words, it is not required to reset the strength of the braking force even when the fishing condition varies to some extent.

Overall, according to the present invention, output current can be accurately controlled to be the level of target braking force by the analog control. Therefore, it is possible to apply stable braking force to the spool even when electromotive force of the coil varies due to variation in the sizes and the attached positions of the magnet and the coil.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spool brake device for a dual-bearing reel, the spool brake device configured to brake electrically a spool rotatably mounted to a reel unit of the dual-bearing reel for allowing a fishing line to be wound thereabout, the spool brake device comprising:
   a spool brake unit including a magnet configured to rotate in conjunction with rotation of the spool, and a coil configured opposite to the magnet to generate electric current with rotation of the magnet;
   a tension detecting unit configured to detect and measure tension on the fishing line; and
   a spool control unit configured to control the spool brake unit by analog-controlling electric current flowing through the coil on the basis of magnitude of the tension.

2. The spool brake device for the dual-bearing reel according to claim 1, further comprising:
   a rotation speed detecting unit configured to detect rotation speed of the spool, the tension detecting unit including a torque detecting unit configured to detect torque for rotating the spool based on a change ratio of the rotation speed detected by the rotation speed detecting unit, and
   the tension detecting unit being configured to detect the tension based on the detected torque.

3. The spool brake device for a dual-bearing reel according to claim 2, wherein
   the spool control unit includes
      a target braking force output part configured to calculate desired target braking force on the basis of the rotation speed and the tension, and output analog target voltage on the basis of the target braking force,
      an electric current detecting part configured to detect electric current output from the coil and convert the electric current into analog detected voltage,
      a differential data output part configured to output differential data on the basis of a potential difference between the target voltage and the detected voltage, and
      an electric current control part configured to control the electric current based on the output differential data for regulating the voltage output from the coil to be the target voltage.

4. The spool brake device for a dual-bearing reel according to claim 3, wherein
   the target braking force output part further includes
      a tension setting section configured to set reference tension, where the reference tension varies on the basis length of a period of time elapsed since rotation of the spool is started,
      a first braking force setting section configured to set a first braking force, and
      a second braking force setting section configured to set a second braking force obtained by increasing the first braking force by a predetermined amount, and the target braking force output part is configured to set the first braking force as the target braking force and output the target voltage on the basis of the first braking force when braking is started, and the target braking force output part is configured to set the second braking force as the target braking force after setting the first braking force, and output the target voltage on the basis of the second braking force when the tension detected becomes less than or equal to the reference tension.

* * * * *